Nov. 21, 1944.  J. H. HUNT ET AL  2,363,182
VEHICLE WHEEL
Filed April 6, 1942  2 Sheets-Sheet 1
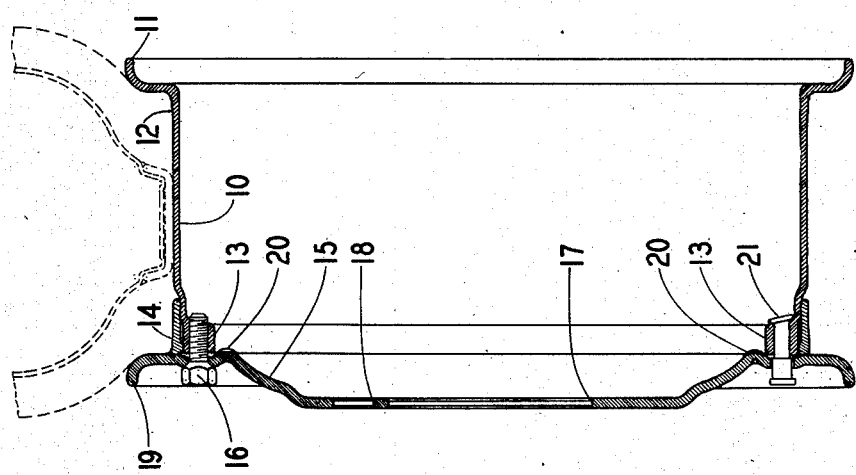
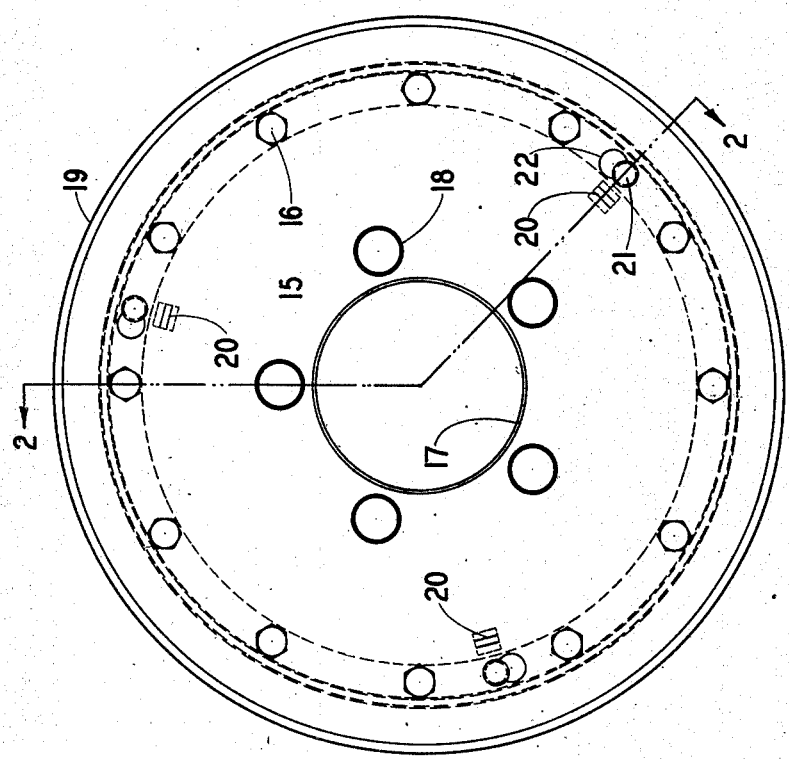
INVENTOR.
J HAROLD HUNT
AND
HARRY J. HORN
BY
Carroll R. Taber
ATTORNEY Nov. 21, 1944.　　J. H. HUNT ET AL　　2,363,182
VEHICLE WHEEL
Filed April 6, 1942　　2 Sheets-Sheet 2

INVENTOR.
J HAROLD HUNT
AND
HARRY J. HORN
BY
Carroll R. Faber
ATTORNEY.

Patented Nov. 21, 1944

2,363,182

UNITED STATES PATENT OFFICE 2,363,182

VEHICLE WHEEL

J Harold Hunt and Harry J. Horn, Lansing, Mich., assignors to Motor Wheel Corporation, Lansing, Mich., a corporation of Michigan Application April 6, 1942, Serial No. 437,805

3 Claims. (Cl. 301—63)

This invention relates to vehicle wheels and more particularly to wheels including rims of the type employing removable tire retaining side flanges.

The principal object of this invention is to provide a novel and inexpensive construction and arrangement of the parts of such a wheel. More specifically, the objects include: the provision of raised tire bead seats at the opposite sides of the rim, one of which is removable; the provision of a removable tire retaining side flange which is integral with a load carrying disk; and the provision of a novel arrangement of parts whereby the rim, the disk and the removable tire bead seat are all secured in assembled relation by common securing means.

Other objects and advantages of the invention will appear from an examination of the following specification when read in connection with the accompanying drawings, wherein Figure 1 is a side elevation of the wheel shown in Figure 2;

Figure 2 is a sectional view taken on substantially the line 2—2 of Figure 1;

Figure 6:
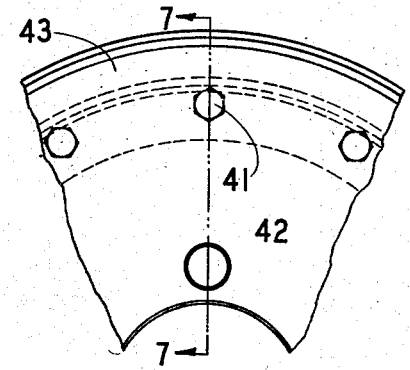
Figures 6 and 7 are fragmentary elevational and sectional views respectively of a further modified form of wheel.

The wheel shown in Figures 1 and 2 includes a rim 10 having an integral tire retaining side flange 11 at one edge thereof and an integral tapered or raised tire bead seat 12 adjacent the flange 11. At its opposite edge the rim 10 is provided with an integral inturned flange 13 which is tapped to receive securing means, as hereinafter described. The rim 10 is of progressively decreasing circumference in an axially outward direction adjacent the side thereof where the flange 13 is located. A separate raised tire bead seat 14 is positioned on the rim in the region of the portion of reduced circumference, the progressive reduction in circumference facilitating the installation and removal of the seat which is in the form of a continuous cylinder.

The rim 10 is mounted upon and supported by a load carrying disk 15 which is secured to the rim by means of cap screws 16. The disk 15 is provided with a conventional hub opening 17 and with openings 18 for the reception of securing means to attach the wheel to a hub.

The disk 15 includes a peripheral portion 19 which is formed to provide a tire retaining side flange similar to the flange 11. Inwardly of its periphery the disk is provided with openings therein which cooperate with the openings in the rim flange 13 to receive the cap screws 16. The disk is preferably indented axially outwardly around each of the openings through which the cap screws extend so that the disk is flexed slightly in that region when the cap screws are threaded home, to provide a lock washer effect and prevent loosening of the cap screws.

Radially inwardly of the openings which receive the cap screws the disk 15 is provided with circumferentially spaced apart axially inwardly extending projections 20 (see Figure 1). These projections serve to help center the rim upon the disk when assembling the parts.

From the foregoing description it will be apparent that the cap screws 16 constitute the sole means for securing the rim and disk together and for securing the removable tire bead seat 14 in place upon the rim. In order to assemble these parts the rim is preferably placed upon its side, the removable tire bead seat is then installed upon the rim, the disk is then placed on the rim flange 13, and finally the cap screws 16 are inserted and threaded home. The parts are disassembled by a reversal of the foregoing procedure.

The peripheral portion 19 of the disk 15 constitutes a removable tire retaining side flange. Such flanges are utilized in order to facilitate the mounting and demounting of a pneumatic tire, such as that indicated in dotted lines in Figure 2. The raised or tapered tire bead seat 14 serves also to facilitate the mounting and demounting of the tire, and at the same time prevents accidental displacement of the tire by holding the tire in proper position.

Provision is made to prevent blowing off of the disk 15 when removing a tire from the rim as might occur when the tire is partially or fully inflated. This is accomplished by providing safety studs 21 which are permanently secured to the rim flange 13 and extend through openings 22 of the bayonet slot type in the disk 15. The bayonet openings 22 constitute a relatively large opening in communication with a relatively small opening. The safety stud 21 includes a large heat at its free extremity which is larger than the smaller portion of opening 22 and smaller than the larger portion of the opening. Thus, when disk 15 is installed, as shown in Figure 1, it is necessary to rotate the disk in a clock-wise direction in order to permit its removal from the rim. That is, after the cap screws have been removed, the disk must be rotated as just described before the disk and rim can be separated and the tire removed from the rim.

Figure 3:
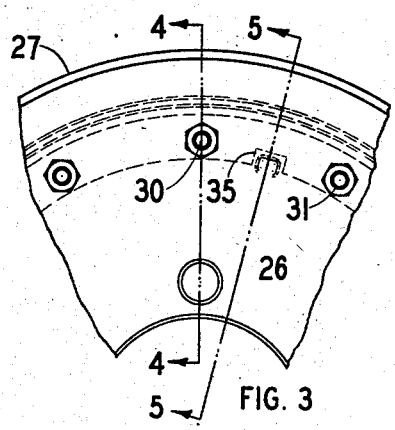
Figures 3, 4 and 5 are fragmentary elevational and sectional views of a modified form of wheel.
Figure 4:
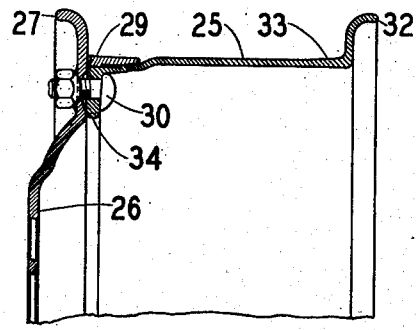
Figure 5:
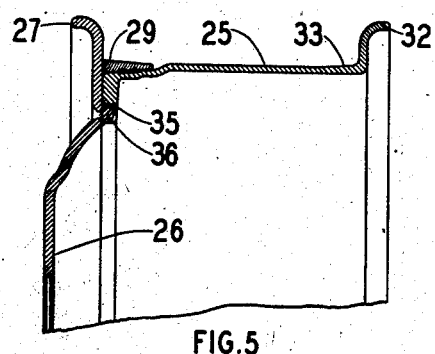

The construction shown in Figures 3, 4 and 5 includes a rim 25, a disk 26 having a peripheral portion 27 constituting a tire retaining side flange, a removable tire bead seat 29 in the form of a cylinder, and securing means comprising studs 30 and nuts 31. The rim 25 is provided with an integral tire retaining side flange 32 and a tapered tire bead seat 33 at one edge thereof. At the other edge the rim is provided with a radially inwardly extending attaching flange 34.

The attaching flange 34 is notched at circumferentially spaced points 35, as best shown in Figures 3 and 5, to receive integral projections 36 which are formed in the disk 26. The projections 36 cooperate with the notches 35 to correctly locate the rim and disk in circumferential relation to each other and to center the one relative to the other so as to properly align the studs 30 with openings provided for that purpose in the disk 36.

The wheel of Figures 3, 4 and 5 is assembled and disassembled in the same manner described in connection with the wheel of Figures 1 and 2. As in the case of the latter wheel, the studs 30 and nuts 31 constitute the sole means for detachably connecting the rim 25 to the disk 26 and for removably securing the raised tire bead seat 29 in place upon the rim.

Figure 7:
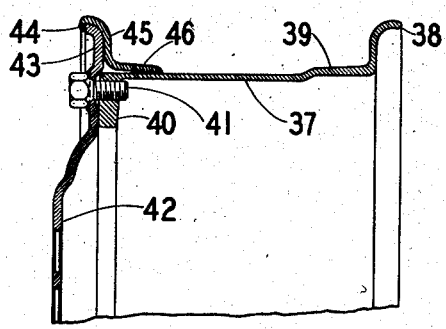

The construction shown in Figures 6 and 7 is generaly similar to that shown in Figures 1 and 2. It includes a rim 37 having an integral tire retaining side flange 38 and a raised tapered tire bead seat 39 adjacent one edge thereof. At the other edge the rim is provided with an inturned flange 40 which is tapped to receive cap screws 41.

The rim 37 is supported by a load carrying disk 42 which includes a peripheral portion 43 formed to correspond generally to the tire retaining flange 38. Secured to the peripheral portion 43 by welds 44 is a generally L-shaped annulus 45 which includes a cylindrical portion 46 constituting a raised tire bead seat. Thus, the load carrying disk and the tire retaining side flange for one side of the rim and the raised tire bead seat for one side of the rim constitute a single unit and are all secured in position relative to the rim 37 by the common securing means 41.

The wheel of Figures 6 and 7 is assembled and disassembled in the same manner as described in connection with the wheel of Figure 1.

From the foregoing it will be apparent that the present invention provides a very simple and inexpensive construction and arrangement of parts which includes a wheel having a removable tire retaining side flange at one side of the rim to facilitate the removal and installation of a tire on the rim and which also includes raised tire bead seats at the opposite sides of the rim, one of which is removable.

The scope of the invention is indicated in the appended claims.

We claim:

1. A wheel comprising a rim member having an integral raised tire bead seat and a tire retaining side flange on one edge thereof, a removable annular raised tire bead seat disposed on said rim member adjacent the other edge thereof, a load carrying disk member juxtaposed to said last named edge of the rim and extending radially outwardly thereof to provide a tire and tire bead seat retaining side flange, one of said members and said removable tire bead seat being constructed and arranged to hold said removable bead seat against axial movement toward said first mentioned edge of said rim, and means for removably securing said disk member to said rim.

2. A wheel as defined in claim 1 wherein a portion of the rim adjacent the edge opposite the integral tire retaining side flange is of reduced circumference and of substantially the same axial extent as the axial extent of the removable bead seat, and said last mentioned bead seat is mounted upon said portion of reduced circumference.

3. A wheel as defined in claim 1 wherein the removable tire bead seat is permanently secured to the load carrying disk.

J HAROLD HUNT.
HARRY J. HORN.